United States Patent [19]
Jabsen

[11] 3,821,079
[45] June 28, 1974

[54] PRESSURIZED WATER NUCLEAR REACTOR WITH UPPER AND LOWER CORE SUPPORT AND POSITIONING MEANS

[75] Inventor: Felix S. Jabsen, Lynchburg, Va.

[73] Assignee: The Babcock & Wilcox Company, New York, N.Y.

[22] Filed: Sept. 9, 1970

[21] Appl. No.: 70,747

[52] U.S. Cl................. 176/61, 176/65, 176/87
[51] Int. Cl.... G21c 11/00, G21c 13/04, G21c 15/22
[58] Field of Search............ 176/50, 61, 64, 33, 65, 176/87

[56] References Cited
UNITED STATES PATENTS

| | | | |
|---|---|---|---|
| 2,990,349 | 6/1961 | Roman | 176/61 X |
| 3,070,527 | 12/1962 | Hurford et al. | 176/61 X |
| 3,089,836 | 5/1963 | Wootton | 176/50 X |
| 3,178,356 | 4/1965 | Wheelock | 176/61 X |
| 3,211,621 | 10/1965 | Creagan | 176/61 X |
| 3,366,546 | 1/1968 | Anthony et al. | 176/50 X |
| 3,366,548 | 1/1968 | O'Neil | 176/87 X |
| 3,395,076 | 7/1968 | Ruppen, Jr. | 176/65 |
| 3,467,578 | 9/1969 | Kornbichler et al. | 176/65 X |
| 3,554,868 | 1/1971 | Thorp | 176/87 X |

FOREIGN PATENTS OR APPLICATIONS

| | | | |
|---|---|---|---|
| 1,122,452 | 8/1968 | Great Britain | 176/87 |

Primary Examiner—Leland A. Sebastian
Assistant Examiner—Roger S. Gaither

[57] ABSTRACT

A pressurized water nuclear reactor wherein the core in the lower portion of the reactor pressure vessel is supported from the lower closure of the vessel and the parts in the upper part of the reactor vessel including the control rod guide tubes are supported from the upper part of the vessel. Differential movements between parts supported from the top and bottom of the pressure vessel as caused by thermal changes are guided in a vertical direction and restrained in a transverse direction to maintain axial alignment of the parts.

7 Claims, 6 Drawing Figures

INVENTOR.

BY

INVENTOR.

BY

PRESSURIZED WATER NUCLEAR REACTOR WITH UPPER AND LOWER CORE SUPPORT AND POSITIONING MEANS

This invention relates in general to a nuclear power reactor, and more particularly to a nuclear reactor of the pressurized water type wherein water is heated in passing through a reactor core located in a pressure vessel.

In a pressurized water reactor, large volumes of water under high pressure are forced through a reactor core to heat the water to a predetermined temperature somewhat below the saturation temperature corresponding to that pressure. Leaving the reactor vessel, the heated water (known as primary fluid) is utilized to heat lower pressure water (known as secondary fluid) so as to produce steam which is usually superheated and supplied to prime movers for the generation of electric energy. The water cooled in generating steam is thereafter recycled to the pressurized reactor so as to reheat the water and to continue the power generation cycle.

The problems attendant upon the construction and arrangement of nuclear reactors are well known, as for example, the necessity for avoiding either general or localized overheating in the reactor core and for maintaining the positional relationship of the parts during use. The parts of a nuclear reactor are normally subjected to at least slight variation in cooling fluid flows, temperature and pressure, even when excluding unusual inadvertent variations in operating conditions. Thus the parts of a reactor must be constructed to provide for operational changes.

In accordance with the present invention, I provide structure for supporting the internal components of a pressurized water nuclear reactor in a simplified arrangement which is characterized by the operational stability of the components and accessibility of the core for fuel replacement. With the structural stability, the flow of core cooling pressurized water is effective and efficiently utilized with relatively low pressure drop. This is accomplished by supporting the core directly from the bottom closure of the pressure vessel and providing the upper portion of the core with a transverse support member which is rigidly attached by connecting hollow tubular members to a upper plate attached to the side walls of the pressure vessels. The core is also confined circumferentially by a core skirt which is attached to the core of the pressure vessel. The uppermost plate is constructed and arranged for support directly from the upper end closure of the pressure vessel. With this construction any operational movement is compensated and permitted by expansion devices positioned between the upper end of the core and the transverse support plate which is in turn guided by the core shield.

Figure 1:
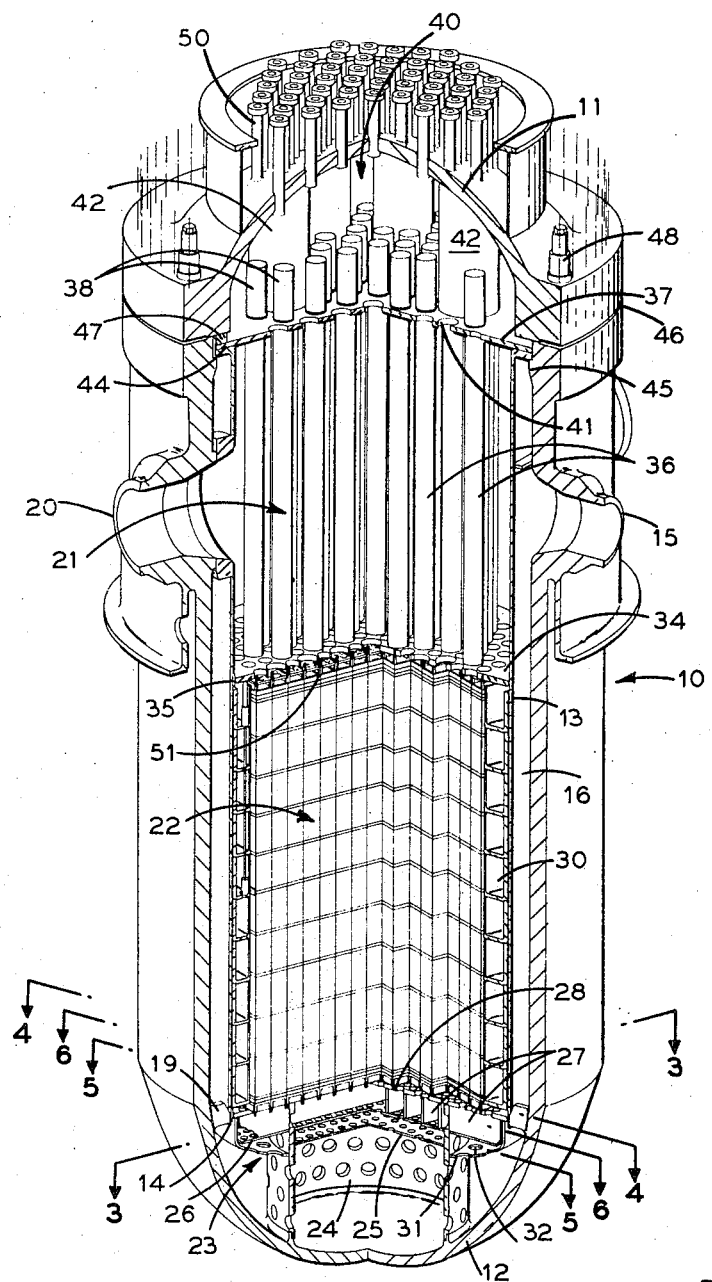
FIG. 1 is an elevation, partly in section, of a pressurized water reactor construction and arranged according to the present invention.

FIGS. 3, 4, 5 and 6 are sections taken along lines 3—3, 4—4, 5—5 and 6—6 respectively, of FIG. 1.

In the illustrated embodiment of the invention shown in FIGS. 1 and 3 through 6, a pressurized water reactor is provided with a substantially upright pressure vessel 10 of circular cross-section having a closed top 11 and an inverted domed bottom closure 12. Internally of the pressure vessel is positioned a core shield 13 which is laterally spaced from and co-axial with the inner surface of the pressure vessel wall. The core shield is attached to and suspended from the upper end portion of the pressure vessel and extends downwardly to a position 14 upwardly spaced from the lower inverted domed closure 12 of the pressure vessel. The lower end 14 of the shield 13 is guided in vertical movement relative to the pressure vessel wall by a series of horizontally disposed circumferentially spaced lugs 19 attached to the wall of the pressure vessel.

As shown, the upper portion of the pressure vessel is provided with four circumferentially spaced water inlet nozzles 15 which discharge into an annular passageway 16 defined between the core shield 13 and the pressure vessel walls. At this same upper level and circumferentially spaced from the inlets are positioned a pair of water outlet nozzles 20 which extend through the pressure vessel and the annular space to open into the internal space 21 circumferentially defined by the core shield 13.

Figure 2:
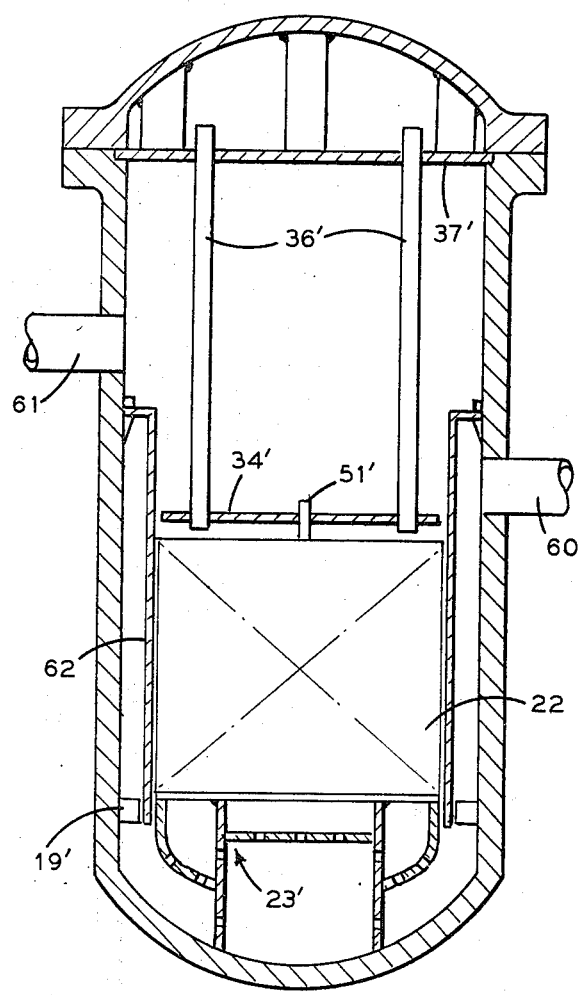
FIG. 2 is a simplified elevation, partly in section of a modification of the invention shown in FIG. 1.
Figure 3:
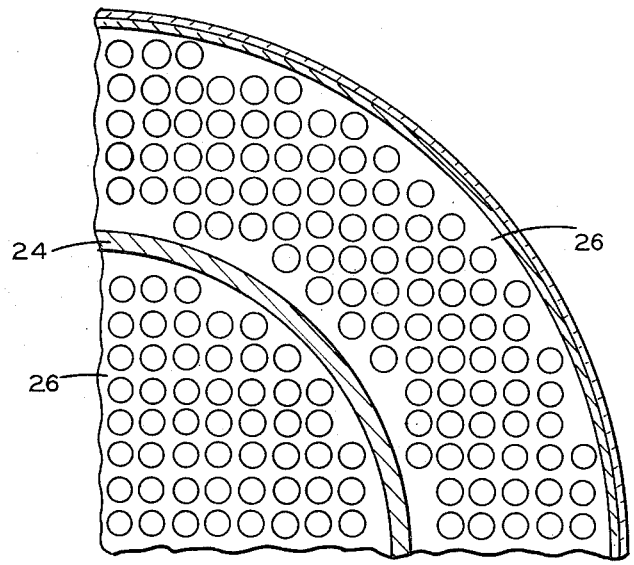
Figure 4:
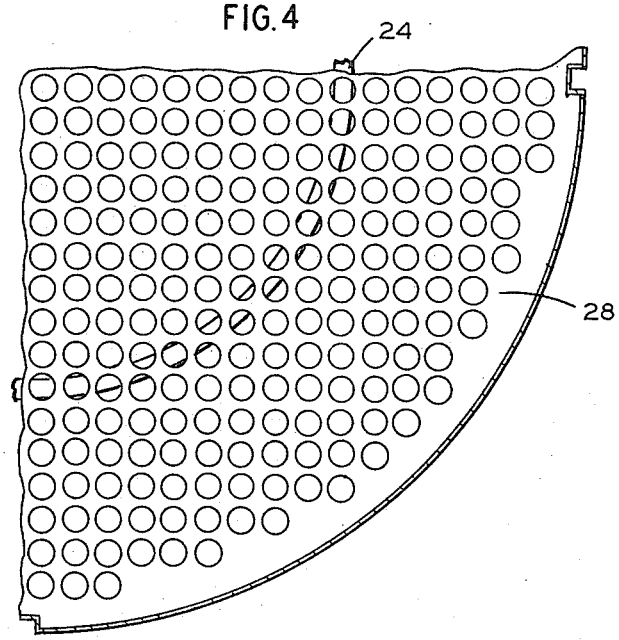
Figure 5:
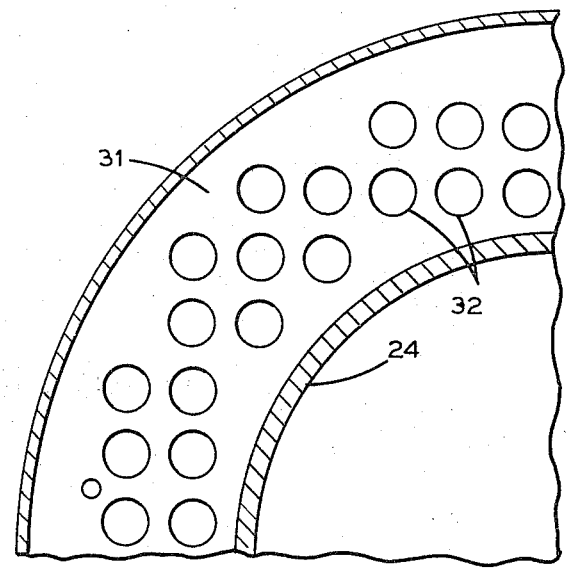
Figure 6:
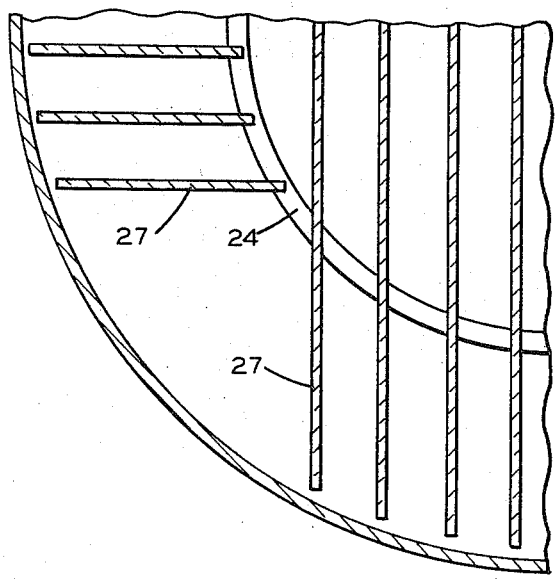

It will be understood the inlet and outlet nozzles need not be positioned at a common elevation. Under such conditions, the upper end of the core shield could be positioned between such offset levels and would be attached to the pressure vessel wall. These changes would be consistent with the subject matter of the present invention, and are shown in the arrangement of FIG. 2, hereinafter described.

The reactor core 22 is positioned in the lower end portion of the core shield and is supported from the bottom closure 12 by a structure 23. Thus, the flow of water is from the inlet nozzles 15 downwardly through the annular passageway 16 between the pressure vessel wall and the core shield 13. The water thereafter reverses direction and flows upwardly through the core 22 into an outlet chamber 21 in the upper portion of the core shield 13 and through suitable openings therein interconnected with the outlet nozzles 20.

As shown, the structural support 23 for the core 22 includes a cylinder 24 co-axially arranged within the pressure vessel and of lesser diameter than the core. The cylinder is fitted into a collar formed in the end closure of the pressure vessel, where the temperature of operation expands the cylinder into close fitting relation to the internal surface of the collar. The cylinder is perforated in a selected pattern for distribution of water flow from the annular passageway 16 with reversal of flow and movement upwardly through a horizontally positioned perforated plate 25 which is located within and attached to the cylinder 24 and is spaced beneath the lower end of the core. A second horizontally disposed perforated plate 26 formed in two pieces is spaced above the plate 25, attached to the cylinder 24 beneath the core 22 and aids in further distribution of cooling fluid flow upwardly into the core 22. Extending across the upper end of the cylinder 24 is a plurality of horizontally spaced beams 27, shown particularly in FIG. 6.

The beams 27 are welded to the underside of a perforated core support plate 28 forming stiffening ribs thereon. The beams 27 are positioned in correspondingly machined slots in the upper end of the cylinder 24 so that the upper surfaces of the beams and the cylinder 24 are coplanar in engaging the lower surface of the plate 28. The core 22 rests directly on the plate 28 so that the weight of the core is transmitted directly to the pressure vessel 10.

The core construction is known per se and generally includes a plurality of fuel elements having the necessary control rod and instrumentation facilities with the core arranged in generally square or rectangular horizontal cross-sectional array. In placing the core assembly in the circular configuration of the core shield 13 the core is fitted within an external thermal shield 30 which is an assembly of castings formed to a configuration suitable to enclose the array of fuel elements and to conform within the inner circumference of the shield 13. The general form of thermal shield configuration is shown in my U.S. Pat. No. 3,205,144 where the particular design of configuration is selected for the particular dimensions of the reactor involved. The thermal shield 30 may be attached to either the core shield 13 or, preferably, to the core 22.

The castings of the thermal shield may be fabricated in segments of a circle for ease of installation or removal, and in units representing one or more rows. In the embodiment shown, each row is formed as a closed hollow in transverse section for strength and rigidity. The closed hollow elements of the thermal shield are appropriately drilled for flow of cooling water upwardly through the shield in parallel with flow through the fuel elements of the core 22.

With the core supported from the pressure vessel 10 through the cylinder 24 and plate 28 the perforations therein cooperate with the perforated plates 25 and 26 for distribution of cooling water flow into and through the core. Distribution of flow is aided by a deflector plate 31 between the outlet of the passageway 16 and the cylinder 24. The deflector plate 31 is of inverted annular domed or elliptical configuration with its upper outer edge attached to the outer end circumference of the plate 28 and attached at its inner lower edge to the outer surface of the cylinder 24. The plate is perforated and positioned to deflect substantially all of the cooling water leaving the passageway 16 inwardly toward the cylinder. A minor portion of the cooling water flow is passed upwardly through openings 32 in the plate 31 and through an annular portion of the two piece plate 26 so as to direct flow of water upwardly through the outer portion of the core 22 and the thermal shield 30.

In the construction so far described, the core 22 is supported directly by plate 28 and cylinder 24 from the lower end closure 12 of the pressure vessel 10. The connection between the lower end of core 22 and the plate 28 is maintained in preferred lateral relationship by dowels or pins therebetween. The core shield 13 in cooperation with the thermal shield 30 aids in maintaining the longitudinal and lateral alignment of the core 22 while permitting guided relative movement between shield 13 and core 22 as caused by thermal forces. The support arrangement of the structure 23 further creates a preferentially directed flow of cooling water upwardly through the core 22 and the fuel elements therein.

A diaphragm or horizontally disposed plate 34 is positioned upwardly adjacent the upper end of the core 22. This plate is provided with circumferentially spaced upright grooves which engage corresponding porjections (shown at 35) formed on the interior surface of the core shield 13, generally at the level of the upper end of the core 22, when the core is in its operative location. The plate 34 is securely attached to the lower ends of a plurality of upwardly extending control rod guide tubes 36 which extend through the discharge chamber 21 to an upper attachment in corresponding openings in an upper plate 37. The plate 37 is horizontally disposed with its periphery attached to the wall of the pressure vessel. The attachment between guide tubes 36 and the upper plate is such as to provide a guide tube extension 38 above the upper plate and into a space defined by the plate 37 and the upper closure of the pressure vessel. As shown, the upper plate 37 is provided with openings 41 therethrough interconnecting the chamber 21 and the space 40. In the construction described, the space 40 receives a minimal, but positive flow of cooling water from the discharge chamber 21 so as to maintain the parts in the space 40 at a desirable temperature. Generally the amount of cooling water flow through the upper space 40 is of the order of one percent of the total flow through the reactor vessel. As shown in the drawings a plurality of cylindrical elements 42 are positioned between the plate 37 and the upper closure 11 of the pressure vessel 10 so as to support and strengthen the structure formed by plates 34 and 37, and the interconnecting control rod guide tubes 36.

The parts in the upper portion of the reactor vessel including the plates 34 and 37, and the guide tubes 36 form a rigid unit which is suspended from and attached to the upper end portion of the pressure vessel. In the embodiment of FIG. 1 the plate 37 and the flange 44 on the core shield 13 are abutting and engage a circumferential shoulder 45 formed internally of the pressure vessel wall adjacent the externally flanged connection 46 between the pressure vessel and the upper closure 11. A spacer ring 47 is positioned above the plate 37 so that tightening the bolts 48 of the flanged connection 47 forces the flange 44 against shoulder 45 to secure the assembly in its structural relationship to the pressure vessel.

It will be noted the plate 37 is relatively thin, (at least in comparison with the constructions heretofore in use) but due to the supporting effect of the elements 42 the entire upper assembly including the plate 34 will move only as a unit with the wall of the vessel 10. Moreover the control rod drive (not shown) mounted above the vessel 10 and the control rods operable in a vertical direction through the housings 50 and the guide tubes 36 will be maintained in vertical and horizontal alignment throughout operations of the reactor.

With the core 22 supported from the bottom of the pressure vessel 10 and the upper guide tube assembly supported from the top of the vessel, relative movement in a vertical direction will occur between the top of the core 22 and the plate 34. Such relative movement is laterally restrained by the core shield 13, and by mechanical vertical expansion and contraction guide connections, shown generally at 51, positioned between plate 34 and the upper end of the core 22. Such connection could be simple pins fixed to the plate 34 (or the core 22) and operable in closely fitting openings in the core 22 (or the plate 34). Connections of a more elaborate nature can be used, such as for example hydraulically operated fingers. In any event, the connections 51 must be capable of permitting relative vertical movement while maintaining true lateral alignment between the guide tubes 36 and the core 22.

In the modified form of the invention shown in FIG. 2, the only changes in the basic structure lies in the inlet nozzle 60 being positioned at a lower elevation in the reactor than the outlet nozzles 61. With this arrangement the core shield 62 is attached to the wall of the reactor intermediate the levels of the inlet and outlet nozzles. In all other respects the structures of FIG. 1 and FIG. 2 are the same. However, in the FIG. 2 illustration, the arrangement of the parts is simplified to more clearly show the support positions of the various parts in the reactor. As shown, the lower portion of the reactor internals, including the core 22', are supported from the lower end of the reactor shell, while the upper portion of the reactor internals, including the control rod guie tubes 36' are suspended from the upper portion of the reactor shell. In the schematic showing of FIG. 2 the horizontal clearance between parts capable of relative vertical movement is exaggerated for purposes of clarity.

In the described construction it will be noted the usual relative movements in the reactor due to operational changes are directed in a vertical direction and coordinated in a horizontal direction to maintain alignment between the related parts. For unusual conditions, the structure is such as to utilize the strength and rigidity of a pressure vessel to maintain the operational relationship of the parts. Moreover, it will be recognized that the structure shown lends itself to ease the fabrication, assembly and part replacement, as for example, in refueling the core since the assemblied parts may be readily removed without breaking welds and with a minimum of bolt connections. To remove the internals it is only necessary to disengage bolts 48 to permit excess for removal of all replacement parts in the nuclear reactor.

What is claimed is:

1. In a pressurized water nuclear reactor, walls defining an upright substantially cylindrical pressure vessel with upper and lower end portions and having generally dome-shaped upper and lower end closures, a substantially cylindrical core shield positioned within and radially spaced inwardly of the wall of said vessel and defining an annular passageway therebetween, said core shield being attached to the wall at the upper end portion of said vessel and extending downwardly to a position spaced above said lower dome-shaped end closure, a reactor core positioned totally within said core shield, means including outlet nozzles positioned in the upper portion of and extending through the wall of said pressure vessel to define a water outlet from said nuclear reactor pressure vessel, means including inlet nozzles positioned in the pressure vessel for flow of water downwardly through the annular passageway surrounding the cylindrical core shield into the lower portion of the pressure vessel and upwardly through said core and the upper portion of the pressure vessel through said outlet nozzles, the improvement comprising support means fixedly secured to the dome-shaped lower end closure and positioned substantially symetrically underneath the core for directly supporting and transversely positioning said core on the dome-shaped lower closure, a first perforated plate positioned directly above the core and a second perforated plate positioned adjacent the dome-shaped upper end closure, said second perforated plate fixedly secured to the pressure vessel, a plurality of upright tubular control rod guide members having upper and lower ends, said guide members being fixedly secured at their lower ends to said first perforated plate and fixedly secured at their upper ends to said second perforated plate, said tubular guide members and said first and second perforated plates comprising a rigid assembly, and means extending between the core and the first perforated plate for permitting relative vertical movement between said first perforated plate and the core while maintaining lateral alignment between the core and the tubular guide members secured to said first perforated plate.

2. In a reactor according to claim 1 wherein said core support means includes a perforated cylinder coaxially arranged with respect to the pressure vessel.

3. In a reactor according to claim 2 wherein a horizontally disposed perforated plate is mounted on said cylinder beneath said core, and the circumference of said plate adjoins the inner surface of said core shield.

4. In a reactor according to claim 1 wherein a cast thermal shield encloses said core within said core shield, the thermal shield being formed as a plurality of hollow superimposed elements.

5. In a reactor according to claim 1 wherein the upper end portions of said control rod guide tubes are secured in said second perforated horizontally disposed plate.

6. In a reactor according to claim 5 wherein said second perforated plate defines the upper boundry of a discharge chamber opening to said discharge nozzles, and said second perforated plate is circumferentially attached to the wall of said pressure vessel.

7. In a reactor according to claim 6 wherein upright elements structurally connect the second perforated plate with the upper closure of said pressure vessel.

* * * * *